United States Patent [19]
Florsek

[11] Patent Number: 5,341,217
[45] Date of Patent: Aug. 23, 1994

[54] DIGITAL ADAPTIVE VIDEO SYNCHRONIZER

[75] Inventor: David T. Florsek, Orlando, Fla.

[73] Assignee: Martin Marietta Corporation, Bethesda, Md.

[21] Appl. No.: 908,602

[22] Filed: Jun. 30, 1992

Related U.S. Application Data

[63] Continuation of Ser. No. 489,007, Mar. 6, 1990, abandoned.

[51] Int. Cl.$^5$ .............................................. H04N 5/10
[52] U.S. Cl. ................................... 348/529; 348/525
[58] Field of Search ............... 358/148, 159, 153, 154; 307/510, 522, 523, 524, 234; 328/111, 108, 139, 138; H04N 5/10

[56] References Cited

U.S. PATENT DOCUMENTS

| | | | |
|---|---|---|---|
| 2,686,833 | 8/1954 | Baracket et al. | |
| 3,814,855 | 6/1974 | Kokado . | |
| 3,878,335 | 4/1975 | Balaban . | |
| 3,904,823 | 9/1975 | Van Straaten . | |
| 3,916,102 | 10/1975 | Merrell . | |
| 4,096,528 | 6/1978 | Tuma et al. . | |
| 4,110,789 | 8/1978 | Mayly | 358/154 |
| 4,253,116 | 2/1981 | Rodgers, III . | |
| 4,414,570 | 11/1983 | Braune et al. . | |
| 4,420,742 | 12/1983 | Tadauchi et al. | 358/464 |
| 4,488,170 | 12/1984 | Nillesen . | |
| 4,614,973 | 9/1986 | Sorenson | 358/153 |
| 4,661,798 | 4/1987 | Ohtsu . | |
| 4,665,437 | 5/1987 | Nicholson . | |
| 4,675,734 | 6/1987 | Widom | 358/153 |
| 4,683,495 | 7/1987 | Brock . | |
| 4,701,796 | 10/1987 | Kamiya . | |
| 4,722,004 | 1/1988 | Miyamoto et al. | 358/153 |
| 4,885,638 | 12/1989 | Bennett | 358/149 |
| 4,922,343 | 5/1990 | Ando | 358/148 |

Primary Examiner—James J. Groody
Assistant Examiner—David F. Harvey
Attorney, Agent, or Firm—Burns, Doane, Swecker & Mathis

[57] ABSTRACT

Synchronization signals for a digital device are derived for an analog composite video source by computing during a "synch-up" phase the average duration of a low synchronization portion of the signal and the average duration of a high active portion of the signal over a predetermined number of lines separated by the synchronization portions. During subsequent operation, the duration of low times and high times as they are encountered in the unknown signal are compared with their respective average durations. If the duration of a low time is significantly longer than the average low time, a vertical synchronization signal is indicated, the vertical synchronization signal being about 20 times longer than the horizontal synchronization signal in a typical video format. Similarly, if the duration of a high time is significantly shorter than the average high time, a video half line is indicated. These two indications combined allow a vertical synchronization signal, a vertical blanking signal and a field number signal to be derived. Together with a composite synchronization signal directly extracted from the video signal, these signal provide all the necessary information to interface with a digital device.

22 Claims, 5 Drawing Sheets

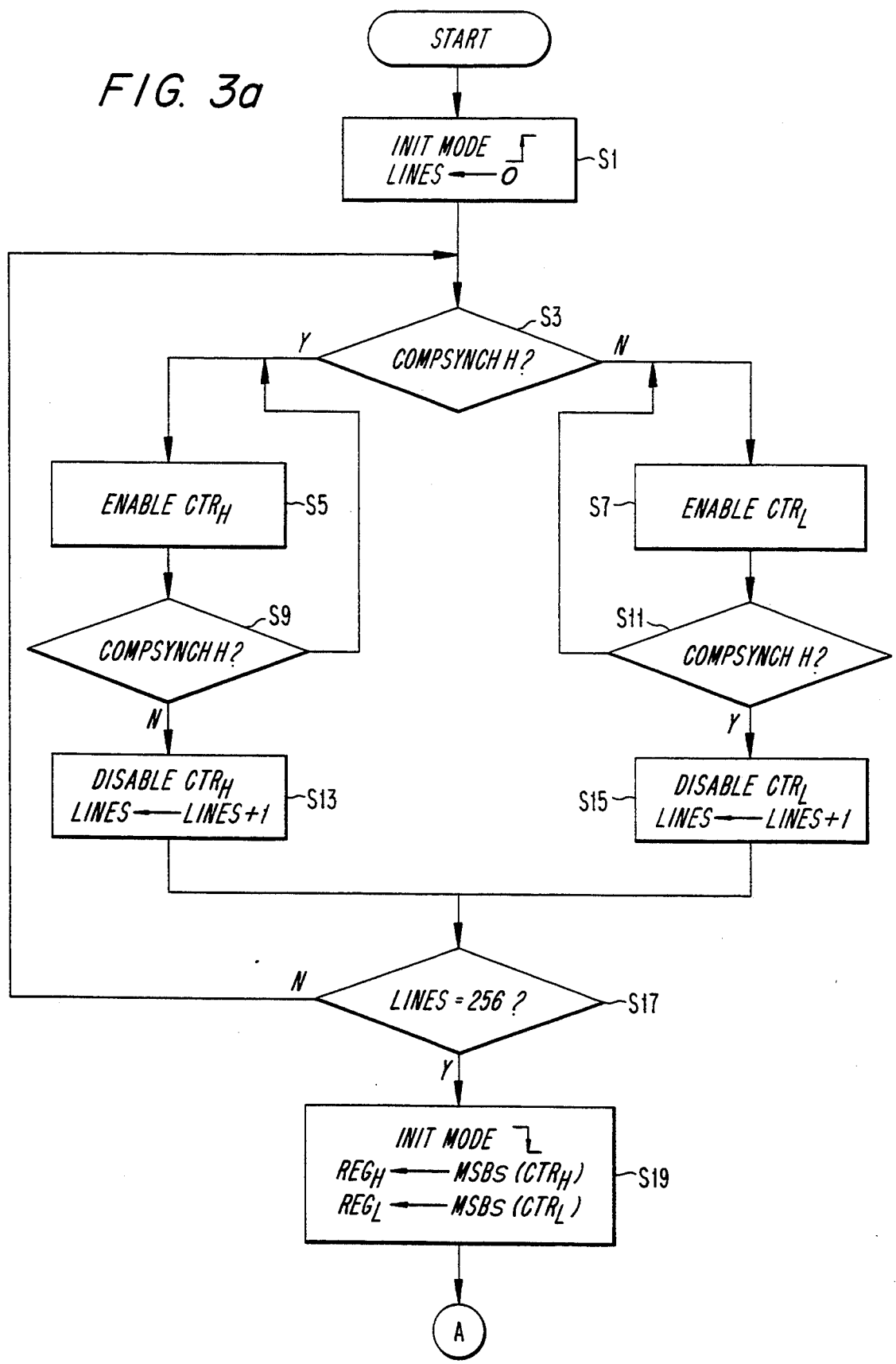

DIGITAL ADAPTIVE VIDEO SYNCHRONIZER

This application is a continuation of application Ser. No. 07/489,007, filed Mar. 6, 1990, now abandoned.

BACKGROUND OF THE INVENTION

This invention relates to adaptive video synchronization and more particularly to a method and apparatus for adaptively deriving from an unknown analog video input the requisite synchronization signals to allow a digital device to utilize the video input.

Technological advances in video displays have brought increasingly high resolutions and led to an increasing proliferation of video formats. Most recently, attention has been focused on developing a new standard for high definition television (HDTV). Normally, each video format requires its own separate video adapter to render the video signal usable by a digital device. Adaptive video synchronizers are known that are capable of performing synchronization with respect to various formats within a limited range. Although such devices are a useful improvement over the one-format one-adapter situation, they are still unable to handle much of the broad array of video formats presently in use, without regard to the rapid development of new formats.

The numerous video formats presently in use vary widely in terms of their line rate, the number of lines per field, their pixel rates, and the use or non-use of serration (auxiliary timing pulses occurring during vertical synch). The unexpected presence or absence of serrations alone is often enough to confuse a non-adaptive synchronizer, and when coupled with additional variations as previously mentioned presents a bewildering array of possibilities beyond the capability of any of the presently-know video synchronizers.

In digital image processing, since considerable effort and expense is devoted to creating sophisticated hardware and software tools for extracting useful information from a video image, it is desirable to provide the greatest possible compatibility between the image processor and the various video sources that may be used.

The adaptive video synchronization method and apparatus of the present invention may be used to interface a variety of analog video sources including video cameras, video cassette recorders, infrared sensors and video discs to a digital system for military or commercial use. Possible applications of the present invention include digital trackers, automatic target recognizers and symbology or graphics boards.

More broadly, the present invention will find wide application in television with its trends toward digital television, the interfacing/integrating of televisions and computers, and especially the looming arrival of high-definition television (HDTV). The adaptive video synchronization method and apparatus can be used with NTSC, European, or Japanese video types.

SUMMARY OF THE INVENTION

According to the present invention, synchronization information is derived from an unknown analog video signal by determining an average duration of one of an active portion and a synchronizing portion of the video signal. The one of the active portion and the synchronized portion is characterized based on the average duration.

More specifically, synchronization signals for a digital device are derived for an analog composite video source by computing during a "synch-up" phase the average duration of a low synchronization portion of the signal and the average duration of a high active portion of the signal over a sampling number of lines separated by the synchronization portions. During subsequent operation, the duration of low times and high times as they are encountered in the unknown signal are compared with their respective average durations. If the duration of a low time is significantly longer than the average low time, a vertical synchronization signal is indicated, the vertical synchronization signal being about 20 times longer than the horizontal synchronization signal in a typical video format. Similarly, if the duration of a high time is significantly shorter than the average high time, a video half line is indicated. These two indications combined allow a vertical synchronization signal, a vertical blanking signal and a field number signal to be derived, and "characterizing" as used in the present specification refers to producing such indications. Together with a composite synchronization signal directly extracted from the video signal, these signals provide all the necessary information to interface with a digital device.

BRIEF DESCRIPTION OF THE DRAWINGS

FIGS. 3a and 3b are a flowchart illustrating the adaptive video synchronization method of the present invention in accordance with the circuit of FIG. 1.

DETAILED DESCRIPTION OF THE PREFERRED EMBODIMENTS

The adaptive video synchronization method and apparatus of the present invention is able to handle any analog video signal patterned after the video formats presently in use by taking advantage of three common characteristics of all such video formats. Of the three most common video formats, the NTSC format has been primarily used in the United States, the PAL format in Europe, and the SECAM format in France and Russia. Despite numerous differences between each of the foregoing formats, each exhibits three common characteristics. Obviously, each of the video signals is a repetitive waveform having a certain periodicity; otherwise, synchronization with the signal would be meaningless and impossible. Also, embedded in each video signal are horizontal and vertical synchronization pulses, the duration of the vertical synchronization pulse greatly exceeding that of the horizontal synchronization pulse in each instance. This characteristic provides the basis for distinguishing between horizontal and vertical synchronization pulses when the video signal format is not known beforehand. Finally, different video fields are separated by a differing number of video half lines. By taking advantage of these three characteristics of virtually all known video formats, the adaptive video synchronization method and apparatus of the present invention is able to derive all the necessary synchronization signals to interface the video signal with a digital device.

An additional problem commonly encountered in effecting synchronization with an unknown video signal is line-to-line misregistration caused by the normal timing skew of the digital system timing, running at a predetermined rate unrelated to the video signal, and the embedded synchronization pulses in the video signal. Misregistration causes the video to waver horizontally as the number of pixels during a line time changes and is dramatically apparent when the video source is a video cassette recorder. The adaptive video synchronization method and apparatus of the present invention also provides a solution to this synchronization problem.

Figure 1:
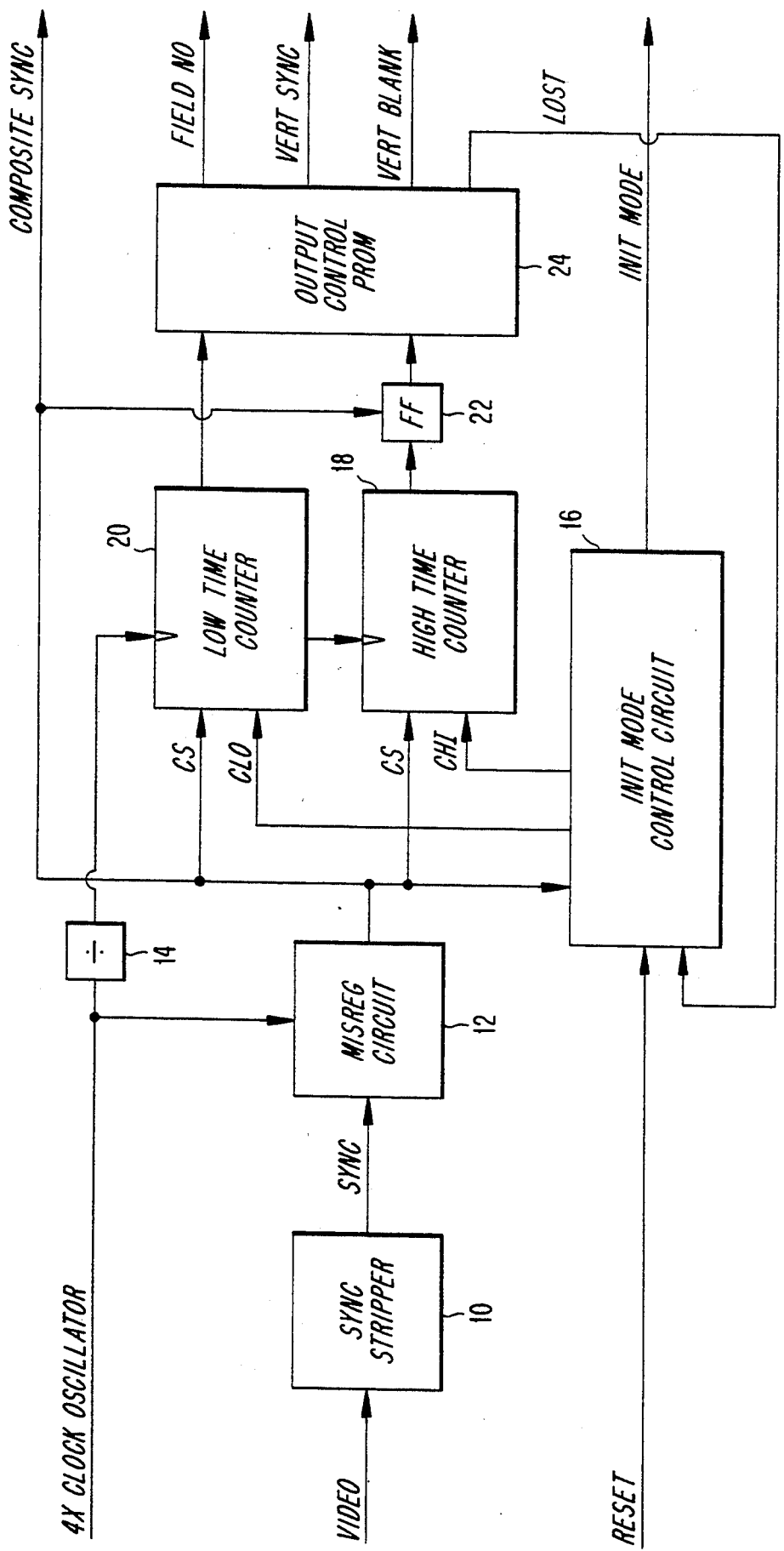
FIG. 1 is a simplified block diagram of an adaptive video synchronization circuit of the present invention.

The manner in which the present invention solves the problems involved in synchronizing with an unknown video signal will be more fully appreciated with reference to the embodiments of the invention illustrated in the drawings. Referring to FIG. 1, an incoming VIDEO signal is applied to a suitable conventional synch stripper 10. The extracted SYNC output signal from the synch stripper 10 is applied to a misregistration circuit 12 comprising, for example, a flip flop which delays the SYNC signal and outputs it as a COMPOSITE SYNC signal (CS) in registration with a clock. For this purpose, a 4X CLOCK signal is applied to the misregistration circuit 12. The 4X CLOCK signal also is applied to a conventional divider 14.

The COMPOSITE SYNC output signal from the misregistration circuit 12 is applied to an initialization mode control circuit 16, a high time counter 18, a low time counter 20, and a flip flop 22 described hereinafter in greater detail. A RESET input signal such as a power-on reset is applied to the initialization mode control circuit 16 which supplies control signals CHI and CLO to the respective counters 18 and 20. The control circuit 16 also provides an output signal INIT MODE described hereinafter in greater detail.

The output signal from the high time counter 18 is applied to the flip flop 22, the output signal from which is applied to an address input terminal of an output control PROM described hereinafter in greater detail. The output signal from the low time counter 20 is similarly applied to an address input terminal of the PROM 24. The output control PROM 24 supplies the FIELD NO, VERT SYNC, and VERT BLANK output signals or other suitable synchronization signals as described hereinafter. In addition, the PROM 24 provides a LOST signal indicating loss of sync to an input terminal of the initialization mode control circuit 24.

In operation, line-to-line misregistration is cured by synchronizing the transitions of the video synchronization signals to the closest occurring edge of the 4X clock signal running at four times the pixel sample rate of the digital system. The video synchronization signals are first extracted from the video signal in the synch stripper 10, which may take the form of a simple thresholding circuit. The train of synchronization pulses is then fed to the misregistration circuit 12 where they are delayed until the next occurrence of the 4X clock. The misregistration circuit may take the form a simple D-type flip flop, for example. Transitions of the resulting COMPOSITE SYNC signal are therefore synchronized to a 1X pixel clock within one quarter of one pixel, and the image is justified to the rising edge of every horizontal line within that same tolerance.

The COMPOSITE SYNC signal is then input to each of the low time counter 20, the high time counter 18 and the initialization mode control circuit 16. During an initialization mode, the counters 18,20 are controlled by the initialization mode control circuit 16 to derive an average low time duration and an average high time duration of the unknown video signal. During this "synching-up" period, the digital utilizing device remains inactive according to an initialization mode control signal INIT MODE.

During an operation mode, the counters 18,20 compare the actual durations of high times and low times as they occur with their respective measured averages and, on the basis these comparisons, cooperate with the output control PROM 24 to generate a field number signal (FIELD NO), a vertical sync signal (VERT SYNC) and a vertical blanking signal (VERT BLANK). The initialization mode signal (INIT MODE) will in the meantime have undergone a transition in order to activate the digital device for operation.

Figure 2A:
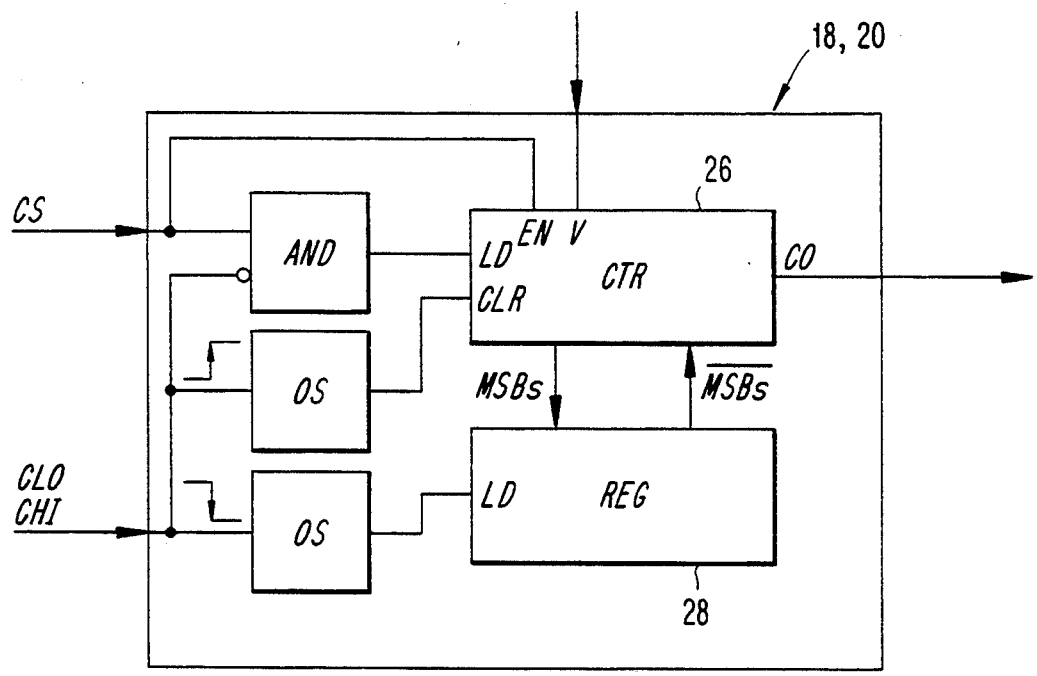
FIGS. 2a and 2b are block diagrams illustrating in greater detail portions of the circuit of FIG. 1.
Figure 2B:
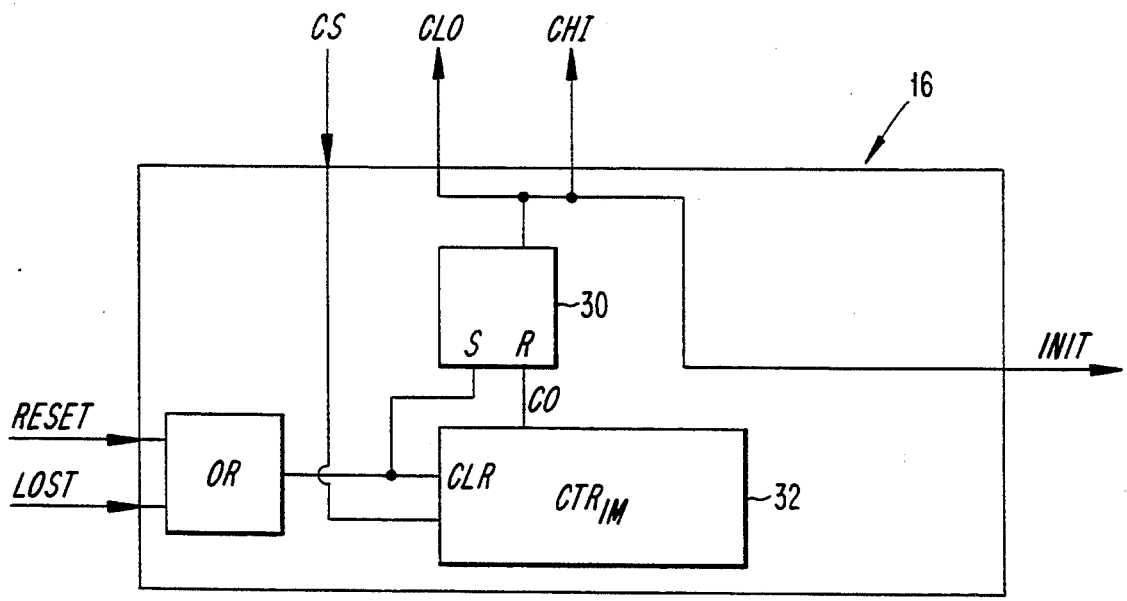

Referring to FIGS. 2a and 2b, one possible implementation of each of the counters 18,20 (FIG. 2a) and of the initialization mode control circuit 16 (FIG. 2b) is illustrated. The counters 18,20 each essentially comprise a counter 26 of suitable capacity, for example twelve bits, and a register 28, which may be of lesser capacity as will presently be explained.

During initialization mode, the counter 26 is cleared at the rising edge of a signal from the initialization mode control circuit 16. The counter 26 is thereafter enabled for counting in accordance with the level of the COMPOSITE SYNC signal, the low counter being enabled when the composite sync signal is low and the high counter being enabled when the composite sync signal is high. The counters 26 are clocked by a signal derived from the pixel clock rate. The counters 26 therefore operate as high time and low time accumulators over a sampling number of lines as determined by the initialization mode control circuit 16. The sampling number of lines may be, for example, 256 allowing the initialization mode control circuit 16 to be based on a simple eight-bit counter 32.

At the occurrence of a reset signal upon power-up or the occurrence of a LOST signal from the output control PROM 24 indicating that the synchronizer has lost track of the video signal, the counter 32 is cleared and a flip flop 30 set, causing a signal CLO or CHI indicating the initialization mode to be issued to both the low time counter 20 and high time counter 18. The counter 32 of the initialization mode control circuit counts each occurrence of a synchronization pulse in the COMPOSITE SYNC signal and overflows after 256 (the sampling number) synchronization pulses have been counted, resetting the flip flop 30 and deactivating the initialization mode signal and the signals CLO and CHI. The falling edge of the signal CLO or CHI loads a number of the most significant bits of the count accumulated in the counter 26 into the register 28, thereby effecting a division by the sampling number of lines over which the count was accumulated. In the case of a twelve-bit counter and a 256 line sampling number, the four most significant bits from the counter 26 would be loaded into the register 28, effecting a division by the sampling number of 256. Thus, although the counter 26 may be of 12 bit capacity, for example, a register of lesser capacity, for example four bit, may suffice.

Upon the next occurrence of the synchronization pulse, the complement of the count loaded from the counter 26 into the register 28 is then reloaded into the counter 26. Counting proceeds throughout the low time of the synchronization pulse, for example, at the pixel clock rate. Since horizontal synch pulses are shorter or equal in duration than the average low time and vertical synch pulses are longer or equal in duration than the average low time, the low time counter 20 will reach a terminal count, producing a carry-out signal, only during a vertical synchpulse. Similarly, since a half video line is shorter or equal in duration than the average high time and a full video line is longer in duration, the high time counter 18 will reach a terminal count, producing a carry-out signal, only during full video lines. Carry-out signals from both the counters 18,20 are applied to the output control PROM 24 to generate the FIELD NO, signal, the VERT SYNC signal and the VERT BLANK signal.

Figure 3B:
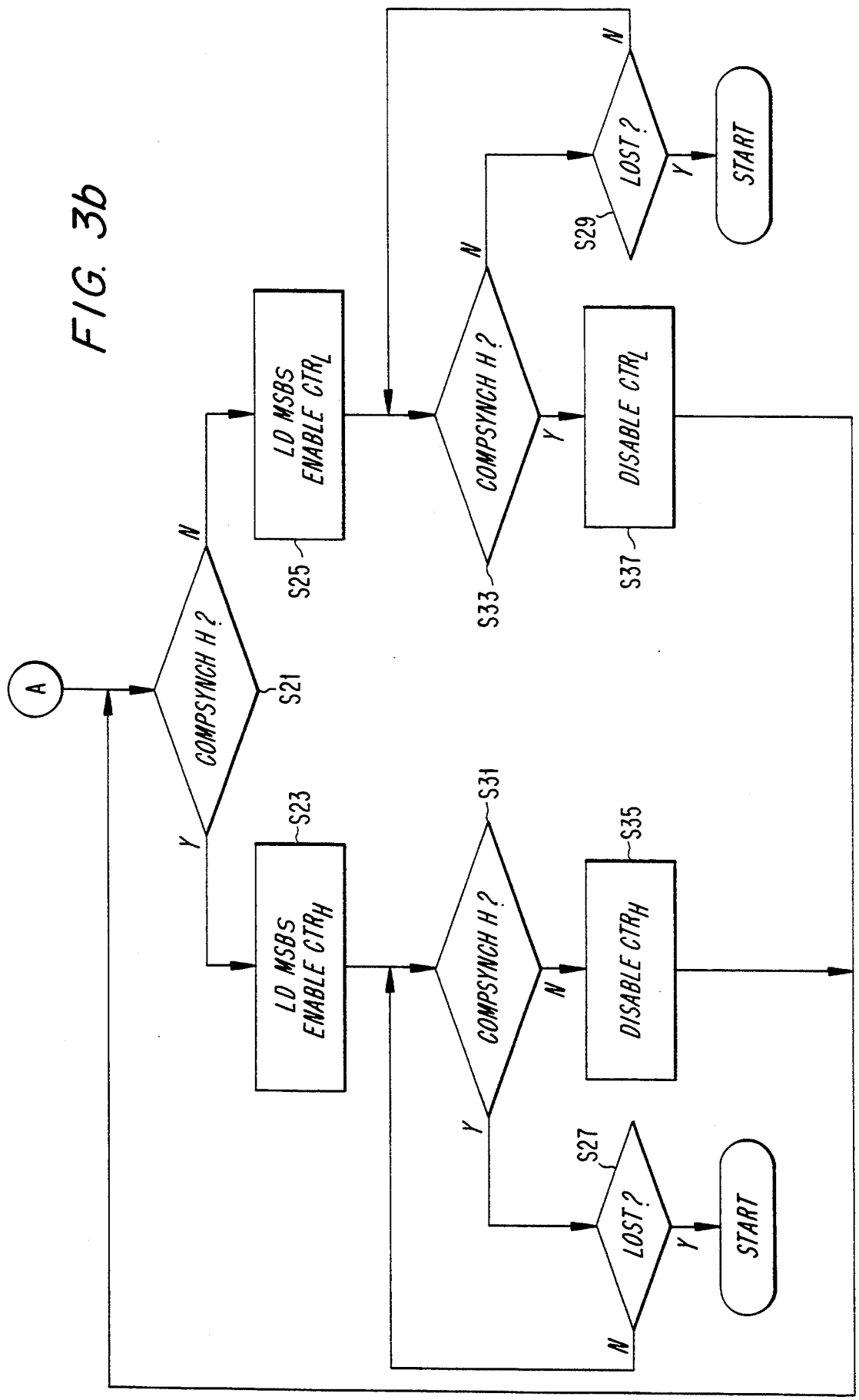

The operation of the adaptive video synchronization circuit of FIGS. 1 and 2 may be visualized in terms of the flow chart of FIGS. 3a and 3b. The initialization mode of operation appears in FIG. 3a, whereas the operational mode appears in FIG. 3b. Describing first the initialization mode, receipt of a RESET signal causes the INIT MODE signal to become active and the number of "synch-up" lines to be reset to zero (S1). At the same time, the counters 26 are also reset to zero.

The level of the COMPOSITE SYNC signal is the checked (S3), and if it is high, the high time counter 18 is enabled (S5), whereas if it is low, the low time counter 20 is enabled (S7). So long as the level of the COMPOSITE SYNC signal remains the same, the respective one of the high time and low time counters is enabled. When the level of the COMPOSITE SYNC signal changes, the respective one of the counters is then disabled (S9–S15). Furthermore, when the COMPOSITE SYNC signal transitions from high to low, the number of synch-up lines already counted is incremented (S17). So long as the number of lines counted is less than the sampling, for example 256, the flow of operations returns to step S3 wherein the level of the COMPOSITE SYNC signal is again tested and one of the low time and high time counters is again enabled.

When the number of lines counted reaches the sampling number, the INIT MODE signal is deactivated and a number of the most significant bits from each of the counters 26 is loaded into the respective registers 28 (S19). The operational mode then begins by checking the level of the COMPOSITE SYNC signal (S21) and, if the composite sync signal is high, loading the complement of the contents of the register 28 into the high time counter and enabling the counter 26 (S23); else, if the COMPOSITE SYNC is low, loading the complement of the contents of the register 28 into the low time counter and enabling the counter 26 (S25). So long as the level of the COMPOSITE SYNC signal remains unchanged, the respective one of the counters 18,20 enabled remains enabled unless the counter is perceived to have been counting for an inordinate amount of time in which case the synchronizer finds itself lost and returns to the beginning of the routine to perform another sync-up operation (S27, S29). In the ordinary case, however, the COMPOSITE SYNC signal will undergo a transition within a reasonable period of time, causing the respective counter to be disabled (S31–S37). Thereafter, the routine returns to step S21 to repeat the foregoing cycle.

Although the description thus far has assumed that actual average values as accumulated in the counters 26 and stored in the registers 28 are used, in practice, these values are multiplied by a tolerance to make allowance for video signals that may be "out of spec". For instance, instead of a synchronization pulse being identified as a vertical synch so long as its duration barely exceeds the average low time duration, it may instead by required to be two or four times as long, for example, as the average low time duration. Similarly, instead of identifying an active line as a full line so long as its duration exceeds the average high time duration, it may be required to be, for example, one and three quarters times as long as the average high time duration. For this purpose, a suitable look up table read only memory may need to be interposed between the counters 26 and the registers 32.

Figure 4:
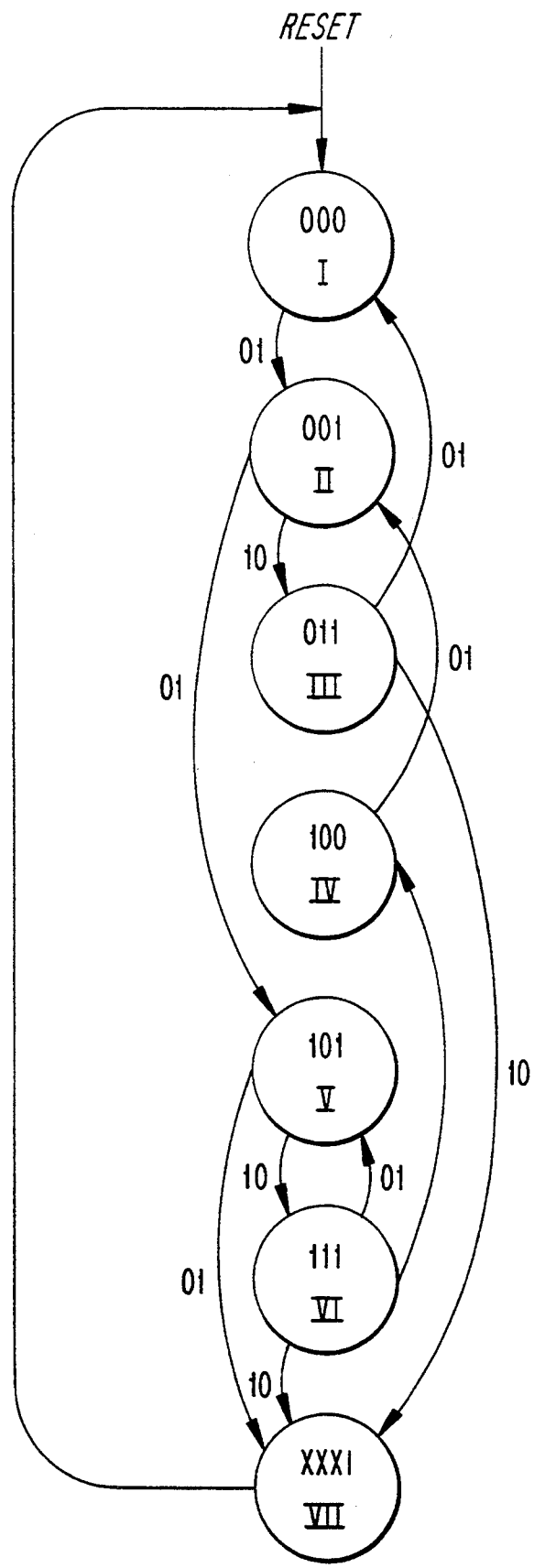
FIG. 4 is a state diagram illustrating the generation of the derived synchronization signals in dependence on the previously generated set of signals and the outputs of the counters in FIG. 1.

Referring to FIG. 4, the output control PROM with its four output signals realizes a simple state machine with seven effective states. Although the three synchronization output signals themselves would normally designate eight different states in their various combinations, two of those states are disallowed since the VERT SYNC signal cannot be active without the VERT BLANK signal being simultaneously active. A seventh state is designated by the LOST output signal regardless of the condition of the remaining outputs, represented by "X"s signifying a don't-care condition. The two digit binary numbers placed alongside the arcs joining various ones of the seven permitted states represent the outputs of the low and high time counters 18,20, the most significant bit representing the output of the low time counter and the least significant bit representing the output of the high time counter as modified by the flip flop 22 in FIG. 1. Whereas the low time counter 20 generates an output pulse upon occurrence of the exceptional event of a vertical synch, the high time counter 18 without any further modification generates a pulse upon occurrence of the usual event of a full video line. The function of the flip flop 22 is to instead generate a pulse upon occurrence of a video half line. A pulse indicating a video full line occurs while the COMPOSITE SYNC signal is low and is therefore not passed through to the output control PROM. If a pulse occurs when the COMPOSITE SYNC signal is high, then a half line has just occurred and the pulse is passed through to the output control PROM.

The three digit binary numbers appearing at the top of states I–VI represent the synchronization outputs of the output control PROM, the most significant bit representing the FIELD NO. output, the least significant bit representing the VERT BLANK output and the intermediate bit representing the VERT SYNC output. At reset, the first state is entered wherein all of the synchronization output signals are inactive. Upon occurrence of a pulse from the modified output of the high time counter 18 indicating a half line, state II is entered and the VERT BLANK output is made active. If a subsequent pulse is received from the low time counter 20, state III is entered and the VERT SYNC signal is made active for a duration corresponding to an active time of the COMPOSITE SYNC signal. The next pulse received should be from the high time counter 18 indicating a trailing half line and causing state II to be re-entered. If instead another pulse from the low time counter 20 is encountered the synchronizer is lost and therefore enters state VII and signals the initialization mode control circuit 16 to begin another initialization mode cycle. After a first half line has been detected causing state II to be entered, if a succeeding half line is next detected, then the occurrence of the alternate field is indicated and state V is entered, activating the FIELD NO. output. States IV-VI for the alternate field are analogous to states I-III for the original field. Although most video formats employ only two alternating fields, the present invention is of course applicable to video formats using a greater number of fields as will be apparent to those of ordinary skill in the art. In the present case, however, if the next pulse encountered indicates a further half line, then the synchronizer is lost and state VII is entered.

Although a preferred embodiment of the present invention has been described in detail, the present invention is susceptible to numerous modifications as will be obvious to one of ordinary skill in the art. For instance, although the construction of the adaptive video synchronization circuit of the present invention has been illustrated in terms of discrete registers and counters, it could also be realized by a suitably programmed microcomputer. As previously mentioned, the adaptive video synchronization method of the present invention is applicable to video formats having any number of fields and although generation of the synchronization output signals in dependence on the outputs of the low time and high time counters has been illustrated for a typical case, the output synchronization signals may be generated in a myriad variety of ways to suit a particular application.

It will therefore be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. An adaptive video synchronizer, comprising:
   means for receiving a composite video signal and outputting a two-level synchronization signal that assumes one of said two-levels only during the occurrence of synchronization portions of said composite video signal;
   first means for timing how long said synchronization signal is at one level;
   second means for timing how long said synchronization signal is at another level;
   means for controlling during an initialization period both said means for timing, and for averaging how long said synchronization signal is at each of said levels over a predetermined number of occurrences of each of said levels;
   means responsive to said means for controlling and averaging for generating a first signal when said synchronization signal is at said one level longer than an average of how long said synchronization signal is at said one level;
   means responsive to said means for controlling and averaging, and to said synchronization signal, for generating a second signal when said synchronization signal is at said other level less than an average of how long said synchronization signal is at said other level; and
   means responsive to said first and second signals for logically combining said signals to form a plurality of synchronization outputs.

2. The adaptive video synchronizer of claim 1, further comprising means for synchronizing said synchronization signal to a clock signal that is a frequency multiple of a basic local clock signal.

3. The adaptive video synchronizer of claim 1, wherein said first and second means for timing each comprises a digital counter capable of being preset using a parallel digital signal.

4. The adaptive video synchronizer of claim 1, wherein each of said means for generating comprises a digital counter capable of being preset using a parallel digital signal.

5. The adaptive video synchronizer of claim 3, wherein said means for controlling and averaging comprises a digital counter of a capacity equal to said predetermined number, a bistable multivibrator, and a pair of registers.

6. The adaptive video synchronizer of claim 5, wherein said means for synchronizing comprises a bistable multivibrator.

7. The adaptive video synchronizer of claim 6, wherein said means for logically combining comprises a programmable read-only memory.

8. A method of deriving synchronization information from an unknown analog video signal comprising the steps of:
   extracting a composite synchronization signal from said video signal;
   counting during the occurrence of a sampling number of transitions of said composite synchronization signal a number of clock signals occurring when said composite synchronization signal is one of a logic high and a logic low
   dividing a count accumulated in said counting step by said sampling number; and
   characterizing a portion of said video signal corresponding to one of a logic high portion and a logic low portion of said composite synchronization signal based on results of said dividing step.

9. The method of claim 8 wherein the number of clock signals occurring when said composite synchronization signal is logic high is counted, and a portion of said video signal corresponding to a logic high portion of said composite synchronization signal is characterized as one of a video full-line and a video half-line.

10. The method of claim 8 wherein the number of clock signals occurring when said composite synchronization signal is logic low is counted, and a portion of said video signal corresponding to a logic low portion of said composite synchronization signal is characterized as one of a vertical synch and a horizontal synch.

11. The method of claim 8 wherein the numbers of clock signals occurring both when said composite synchronization signal is logic high and when said composite synchronization signal is logic low are separately counted and both counts are divided by said predetermined number, and a portion of said composite synchronization signal is characterized as one of a video full-line and a video half-line based on results of said dividing step and a portion of said video signal corresponding to a logic low portion of said composite synchronization signal is characterized as one of a vertical synch and a horizontal synch based on results of said dividing step.

12. A video synchronization device, comprising:
   first counting means for counting, during the occurrence of a sampling number of logic level transitions in a composite synch signal separated from an analog video signal, a number of clock signals occurring during a first recurrent portion of said analog video signal and for dividing a count accumulated in the course of said counting by said sampling number; and first generating means, responsive to a result of said dividing, for generating a first synchronization signal.

13. A video synchronization device, comprising:

first counting means for counting, during the occurrence of a first sampling number of logic level transitions in a first composite synch signal separated from an analog video signal, a number of clock signals occurring during a first recurrent portion of said analog video signal and for dividing a count accumulated in the course of said counting by said first sampling number;

first generating means, responsive to a result of said dividing, for generating a first synchronization signal;

second counting means for counting, during the occurrence of a second sampling number of logic level transitions in a second composite synch signal separated from said an analog video signal, a number of clock signals occurring during a second recurrent portion of said analog video signal and for dividing a count accumulated in the course of said counting by said second sampling number; and second generating means, responsive to a result of said dividing, for generating a second synchronization signal.

14. The method of claim 9 further comprising the step of generating a field number signal based on the characterization of said portion of said video signal corresponding to said logic high portion of said composite synchronization signal.

15. The method of claim 10 further comprising the step of generating a vertical synchronization signal based on the characterization of said portion of said video signal corresponding to said logic low portion of said composite synchronization signal.

16. The method of claim 11 further comprising the step of generating a field number based on the characterization of said portion of said video signal corresponding to said logic high portion of said composite synchronization and generating a vertical synchronization signal based on the characterization of said portion of said video signal corresponding to said logic low portion of said composite synchronization signal.

17. The method of claim 11 further comprising the step of alerting a control circuit when one of said numbers of clock signals divided by said sampling number exceeds a corresponding one of respective predetermined limits.

18. The method of claim 11 further comprising the step of synchronizing each occurrence of a transition edge of said composite synchronization signal to a next-occurring pulse of a clock running at a frequency at least twice a pixel sampling rate of a digital utilizing device.

19. The method of claim 11 further comprising the step of generating a signal when said dividing step has been performed.

20. The video synchronization device of claim 13 wherein said first recurrent portion is logic low portion of said video signal and said second recurrent portion is a portion of said video signal excluding said logic low portion.

21. The video synchronization device of claim 20 wherein said first synchronization signal is a vertical synchronization signal and said second synchronization signal is a field number signal.

22. The video synchronization device of claim 20 wherein said first and second means for generating comprises a programmable logic device.

* * * * *